United States Patent
Graf et al.

(10) Patent No.: US 9,474,966 B2
(45) Date of Patent: *Oct. 25, 2016

(54) SYSTEMS AND METHOD FOR MAKING GAMEPLAY CHANGES BASED ON SOCIAL NETWORKING POLLS

(71) Applicant: Epic Games, Inc., Cary, NC (US)

(72) Inventors: Joseph James Graf, Cary, NC (US); Stephen Lynn Superville, Apex, NC (US)

(73) Assignee: EPIC GAMES, INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,935

(22) Filed: May 4, 2015

(65) Prior Publication Data
US 2015/0231497 A1    Aug. 20, 2015

Related U.S. Application Data

(63) Continuation of application No. 13/838,345, filed on Mar. 15, 2013, now Pat. No. 9,072,974.

(60) Provisional application No. 61/716,045, filed on Oct. 19, 2012.

(51) Int. Cl.
 *G07F 17/32* (2006.01)
 *A63F 13/35* (2014.01)

(52) U.S. Cl.
 CPC ................. *A63F 13/35* (2014.09)

(58) Field of Classification Search
 USPC .................................. 463/42, 29
 See application file for complete search history.

(56) References Cited

U.S. PATENT DOCUMENTS

| | | | | |
|---|---|---|---|---|
| 2013/0132221 A1* | 5/2013 | Bradford | ............... | G06Q 50/01 705/26.1 |
| 2013/0260896 A1* | 10/2013 | Miura | ............... | A63F 13/12 463/42 |
| 2014/0179425 A1* | 6/2014 | Perry | ............... | A63F 13/12 463/31 |
| 2014/0179428 A1* | 6/2014 | Miura | ............... | A63F 13/12 463/31 |
| 2014/0179439 A1* | 6/2014 | Miura | ............... | A63F 13/12 463/42 |
| 2014/0187323 A1* | 7/2014 | Perry | ............... | A63F 13/10 463/31 |
| 2015/0011320 A1* | 1/2015 | Ocko | ............... | A63F 13/12 463/42 |

* cited by examiner

*Primary Examiner* — Pierre E Elisca
(74) *Attorney, Agent, or Firm* — Hunton & Williams LLP

(57) ABSTRACT

Various exemplary embodiments are provided to make gameplay changes to a video game based upon a social networking poll or question. These embodiments use the social networking poll to control and organize gaming client feedback and provide gameplay changes based on the gaming client feedback. The various exemplary embodiments also allow a gaming client to receive updates to his or her gaming client device that reflect the gaming client feedback.

20 Claims, 4 Drawing Sheets

SYSTEMS AND METHOD FOR MAKING GAMEPLAY CHANGES BASED ON SOCIAL NETWORKING POLLS

CROSS REFERENCE TO RELATED APPLICATIONS

This patent application is a continuation of U.S. application Ser. No. 13/838,345, filed Mar. 15, 2013, which claims priority to U.S. Provisional Patent Application No. 61/716,045, filed Oct. 19, 2012 entitled "Systems and Methods for Making Gameplay Changes to a Video Game Based Upon Social Networking Polls," to Joseph James Graf and Stephen Lynn Superville. The contents of these priority applications are incorporated by reference herein in their entirety.

FIELD OF DISCLOSURE

The present disclosure relates to systems and method for making gameplay changes to a video game based upon a social networking poll or question.

BACKGROUND OF THE DISCLOSURE

Players of games often have feedback that they would like the game developers to hear and act upon. The delivery of this feedback can be disorganized, spread across numerous forums and online communities, making it difficult for the feedback to be heard and acted upon. Additionally, the game developers cannot control the conversation that it may be narrowly focused on choices that affect the game. Due to these issues there is not a suitable mechanism for polling the game community for the direction the community would like the game developers to take the game balancing. These and other drawbacks exist.

SUMMARY OF THE DISCLOSURE

Various exemplary embodiments assist the community as a whole in focusing the disparate conversations about the game balancing and design choice by using social networks and social graph application programming interfaces (APIs) in order to obtain feedback directly affecting a game. These embodiments allow a game developer to frame a question or poll on a social network and define the options and choices that players of the game may cast a vote on.

These embodiments further allow a system to read the game players' interactions with the poll(s) or question(s) from the social network using a social graph API and apply the results of the poll(s) or question(s) to make changes to the relating game.

BRIEF DESCRIPTION OF THE DRAWINGS

The present disclosure, together with further objects and advantages, may best be understood by reference to the following description taken in conjunction with the accompanying drawings, in the several Figures of which like reference numerals identify like elements, and in which.

DETAILED DESCRIPTION OF EXEMPLARY EMBODIMENTS

Figure 1:
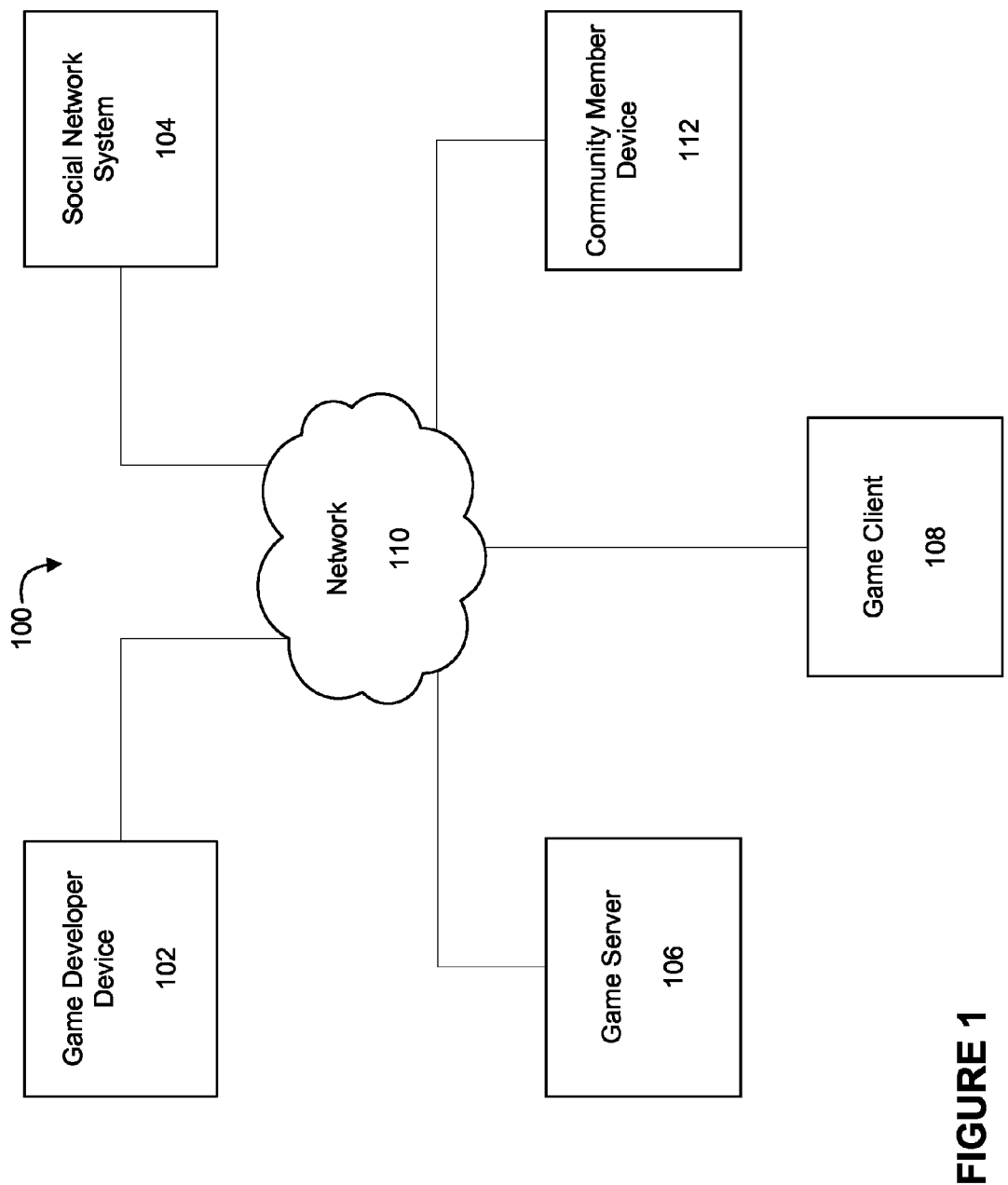
FIG. 1 is a schematic diagram illustrating a social networking polling and gaming system according to a particular embodiment.

The following description is intended to convey a thorough understanding of the embodiments described by providing a number of specific embodiments and details involving systems and methods for providing gameplay changes to a video game based upon a social networking poll or question. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Various exemplary embodiments provide for making gameplay changes to a video game based upon a social networking poll or question.

The following terms referred to herein may be understood as follows:

In various embodiments, the term "game" or "client" may refer to the software product a person is using.

In various embodiments, the term "game server" may refer to the networked computer or groups of computers that process the global game event state.

In various embodiments, the term "social network" may refer to the media, software, systems, and networks that allow users interact socially.

In various embodiments, the term "social graph API" may refer to the API for manipulating the social network objects. This API may manage connections between objects and the information of how those objects relate.

A system and method may include various exemplary embodiments for making gameplay changes based on social networking polls and/or other forms of user/member feedback. The system and method may include a game developer device, game server, game client, community member device and a social network system all connected over a network. The system and network may further include the development and administration of a social networking poll in a polling module of a social networking system. A social networking poll or survey may include a description of gaming situations, such as, for example, gaming challenges, gaming scenarios, and gaming levels; game play options, such as, for example, character options, character attribute options, difficulty options, bonus options, and booster options; and/or any game-related question. A social network system may also include a social graph module that provides and determines a social networking graph of all network members, including network member connections and network member information. Network member information may include, for example, member name, member e-mail address, member birthdate, member location data, and member gaming information, such as, for example, games owned, games played, and played games data. Played games data may include, game(s) played, how often a member plays a game, game options purchased, game levels attained, game character usage, game points attained, game length played, a number of friends that play a game, game usage and social data, and the like.

A member of the social network system may publish a social networking poll for making gameplay changes through the polling module, where the polling module may then receive network member responses to the published poll. Other forms of member interaction and/or member feedback may also be considered in accordance with the various embodiments of the present invention. In addition to receiving network member responses, the polling module of the social network system may record network member information along with the associated network member response. The member who published the social networking poll may select a predefined time for the end of a poll or may choose to end the poll at any chosen time. Once the poll has been closed, the results of the poll may then be sent to the game server, where the results may be calculated based on a selected results calculation type. The calculated results may then be provided to a gaming module within the game server, where gameplay changes may be made based on the calculated results. Upon providing the gameplay changes, community members may be able to play, use, and/or watch gameplay changes via the gaming module at the game server.

Referring now to the drawings, FIG. 1 is a schematic diagram illustrating a system 100 for making gameplay changes to a game based upon a social networking poll or question. The system 100 may include a game developer device 102, a social network system 104, a game server 106, a game client 108, and a community member device 112. Examples of social networking systems include, without limitation, systems that operate the sites of Facebook, MySpace, Google+, LinkedIn, Twitter, Pinterest, etc. For purposes of this disclosure, the game developer device 102 and game server 106 are separate components. However, the game developer device 102 and game server 106 may also be combined into one component capable of performing all the actions of the game developer device 102 and the game server 106.

Each of these devices or systems may include a network-enabled computer system and/or devices. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, a game server, a gaming console, or other device. The network-enabled computer systems may execute one or more software applications to, for example, receive data as input from an entity accessing the network-enabled computer system, process received data, transmit data over a network, and receive data over a network. The one or more network-enabled computer systems may also include one or more software applications to enable making gameplay changes to a video game based upon a social networking poll or question, as described herein.

The components depicted in FIG. 1 may be coupled via one or more networks, such as, for example, network 110. Network 110 may be one or more of a wireless network, a wired network or any combination of wireless network and wired network. For example, network 110 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving a data signal.

In addition, network 110 may include, without limitation, telephone lines, fiber optics, IEEE Ethernet 902.3, a wide area network ("WAN"), a local area network ("LAN"), or a global network such as the Internet. Also network 110 may support an Internet network, a wireless communication network, a cellular network, or the like, or any combination thereof. Network 110 may further include one network, or any number of the exemplary types of networks mentioned above, operating as a stand-alone network or in cooperation with each other. Network 110 may utilize one or more protocols of one or more network elements to which they are communicatively coupled. Network 110 may translate to or from other protocols to one or more protocols of network devices. Although network 110 is depicted as a single network, it should be appreciated that according to one or more embodiments, network 110 may comprise a plurality of interconnected networks, such as, for example, the Internet, a service provider's network, a cable television network, corporate networks, and home networks.

Figure 2:
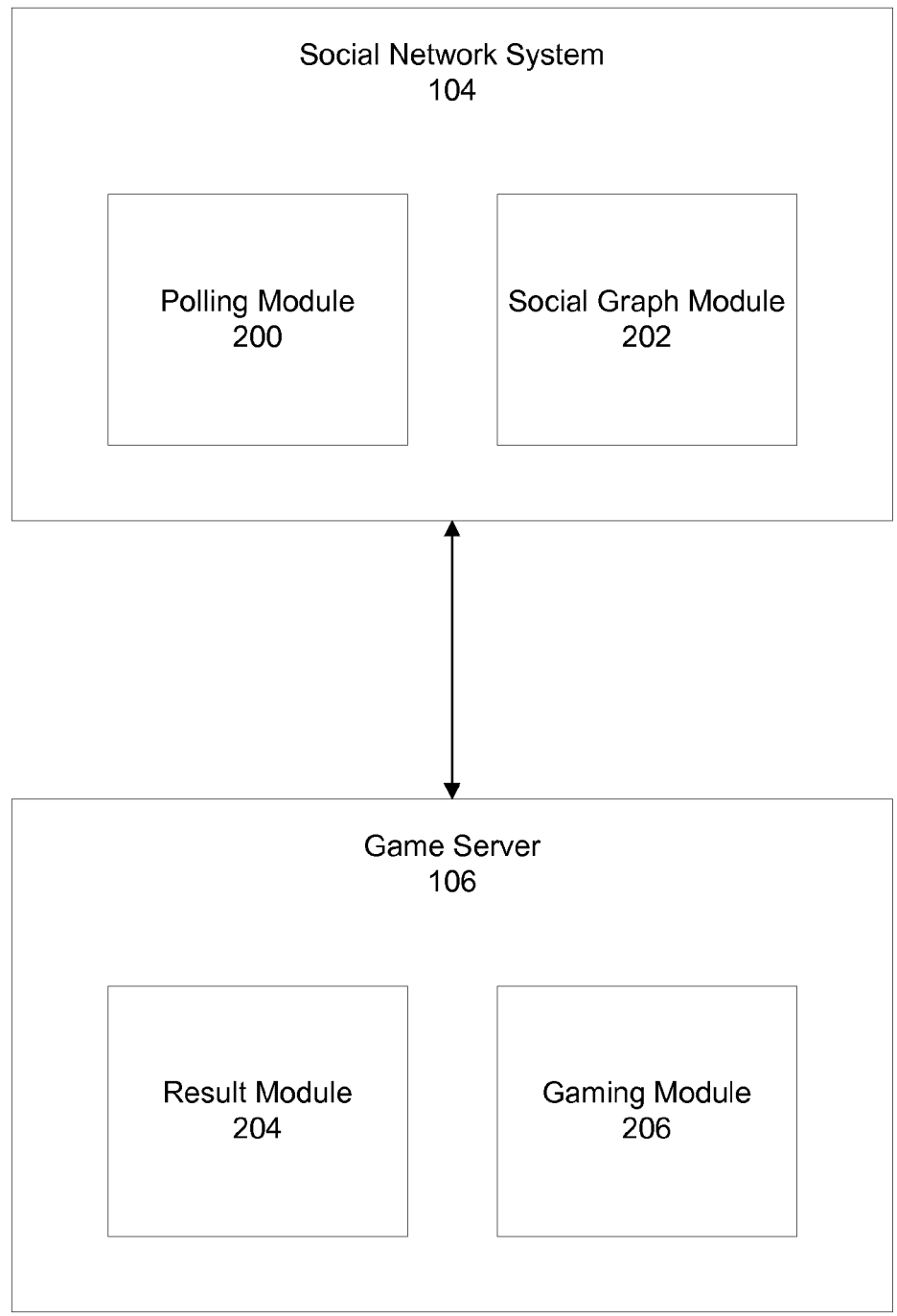
FIG. 2 is a block diagram of hardware components of a social networking polling and gaming system according to a particular embodiment.

FIG. 2 is a block diagram of hardware components of a social networking polling and gaming system according to a particular embodiment. Illustrated in FIG. 2 are various components includes an exemplary social network system 104 and an exemplary game server 106. The components of FIG. 2 may be connected over a network as illustrates in FIG. 1. Moreover, data may be transmitted and received on a social network system 104 and a game server 106 wirelessly or may utilize cabled network or telecom connections such as an Ethernet RJ45/Category 5 Ethernet connection, a fiber connection, a traditional phone wireline connection, a cable connection or other wired network connection. Network 110 may use standard wireless protocols including IEEE 802.11a, 802.11b and 802.11g. Network 110 may also use protocols for a wired connection, such as an IEEE Ethernet 802.3.

As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

The social network system 104 may include a polling module 200 and a social graph module 202. A polling module 200 may include hardware and software components required to receive polling data from a community member device 112 when a community member desires to publish a poll regarding gameplay, a game server 106 when a game owner desires to publish a poll regarding gameplay, and/or a game developer device 102 when a game developer desires to publish a poll regarding gameplay. A polling module 200 may further include hardware and software components required to publish a social networking poll to a social networking site. A polling module 200 may include hardware components required to receive polling results from a community member device 112 when a social network community member participates in a poll. Moreover, a polling module 200 may include hardware and software components required to associate community member data, including social graph data, from data storage (not pictured) within the social network system and/or a social graph module 202.

The social network system 104 may also include a social graph module 202. A social graph module 202 may include hardware and software components to determine social relationships between social network community members. For example, a social network community member may have a first degree connection with another social network community member who has granted access to his or her account. As another example, a first social network community member may have a second degree connection with a second social network community member, when the second social network community member is a first degree connection with a first degree connection of the first social network community member. Varying degrees of connection may exist across all social network community members based on the number of "connections" that are between a first social network community member and a second social network community member.

The game server 106 may include a result module 204 and a gaming module 206. A result module 204 may include hardware and software components to calculate the results of a social network poll provided by the social network system. The result module 204 may, for example, tally the results by adding the results of a particular poll result together to obtain a result total. The result module 204 may also employ a variety of weighting methods, such as, for example, weighting a result based on whether or not a social network community member "participates" in a poll. Participation in a poll may include providing commentary on a poll or a polling result, providing a link to a social network poll via the social network system 104 or a second social network system (not shown), sharing a social network poll with another social network community member(s), and/or providing support to a social network poll via a "like," "heart," "high-five," or the like. The result module 204 may also weight a result using an in game and/or backend ranking system so that a response from a social network community member who attaches his or her social network name to his or her selected result may be more heavily weighted than a response from a social network community member who responds anonymously. The result module 204 may also weight a result using social graphing data provided by the social graph module 202. For example, where a first social network member provides a response and then through "participating" in the poll as described above is able to solicit a poll response from a second social network member, the first social network member's response may be more heavily weighted. The results module 204 may further weigh results based on a social network member's current location, a social network member's home location, played games data, and/or any other network member information stored in the social network system. The results may be provided to the game server along with the social network poll results. The results module 204 may also include the hardware and software required to transmit the results to the social network system 104. The social network system 104 may then notify poll participants of the result and whether the poll participant's choice was selected as the result in the result module 204.

The gaming module 206 may include hardware and software components to receive the social network polling results from the result module 204 once the result module has calculated the results. The gaming module 206 may include hardware and software components to incorporate a winning result into a game so that community members may be able to play, use, and/or watch gameplay changes. Gameplay changes may include, additional gaming challenges, additional gaming scenarios, and additional gaming levels, additional character options, additional character attribute options, additional difficulty options, bonus options, and/or booster options. Gameplay changes may further include unlocking communal gaming content and/or a dynamic alteration of prices and/or availability of goods in a game.

Figure 3:
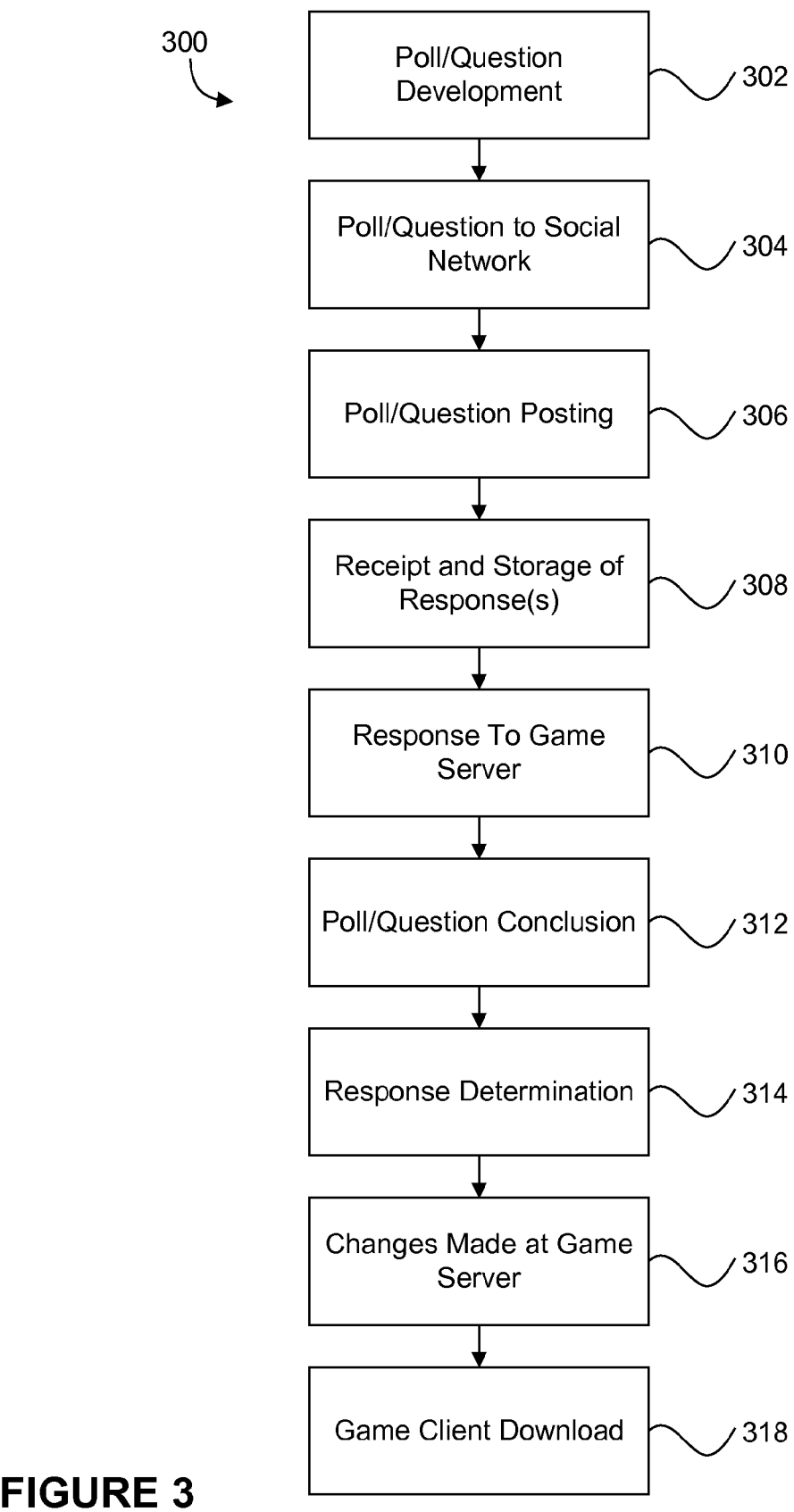
FIG. 3 is a flow chart illustrates social network polling and gaming according to a particular embodiment.

Referring to FIG. 3, which is a flow chart illustrates social network polling and gaming according to a particular embodiment, the process begins with the development of a poll or question at the game developer device 102, community member device 112, and/or game server 206 (step 302). The poll or question may include predetermined responses to the poll or question along with identifiers for each of the responses to the poll or question. The poll or question that was developed on the game developer device 102, game server 106, and/or community member device 112 may then be transmitted over the network 110 to a social network system 104 (step 304). Once the poll or question has been transmitted to the social network system 104 (step 304), the social network system 104 may then publish the poll or question such that the poll or question is visible to the community that uses the social network via a community member device 112 (step 306). A game developer device 102 may also be a community member device 112 when a game developer is also a member of the social network housed on the social network system 104. Moreover, a game developer device 102, community member device 112, and a game client device 108 may be the same device.

Each community member belonging to the social network may then interact with the social network system 104 via his or her community member device 112 in order to send a response to the question or poll to the social network system 104 over the network 110 (step 308). A community member may belong to a social network by registering for that social network, by responding to an invitation to join the social network, or the like. Each response from each community member device 112 is also stored within a polling module 200 (step 308). The interaction between the community member device 112 and the social network system 104 may be available to the game server 106 and other components via social graph APIs.

The responses and any community member data may be transmitted to a server 106, where the responses and/or community member data may be stored in a result module 204 or a data storage unit (not shown) (step 310). Each response and/or identifier may be associated with a specific gameplay option. At any time, the creator of the poll or question may terminate the poll or question, or, conversely, the poll or question may terminate at a configurable time interval (step 312). A poll or question may terminate once a predefined number of votes are received. For example, a poll or question may terminate upon receiving 10,000 votes. Response may be sent to a game server 106 on any interval, such as hourly, daily, or weekly, or may be sent once a poll or question has concluded. Once the poll or question has concluded, a result module 204 may analyze and calculate a winning gameplay option based on the responses and/or community member data transmitted from the social network system 104 (step 314). Various calculation and determination methodologies are described herein with reference to the result module 204. The game changing option associated with the winning selection may then be prepared in a gaming module 206 at the game server 106 (step 316) so that wining gameplay option may be available to any requesting client at his or her respective game client device 108. The requesting client may download and/or access the winning gameplay response and/or options via a game client device 108 connected to a game server 106 over a network 110 (step 318).

It is to be understood that the steps of the method 300 may proceed in the above order. However, the steps of the process may also proceed in a different order and may incorporate other steps as necessary to achieve gameplay changes to a video game based upon a social networking poll or question.

Figure 4:
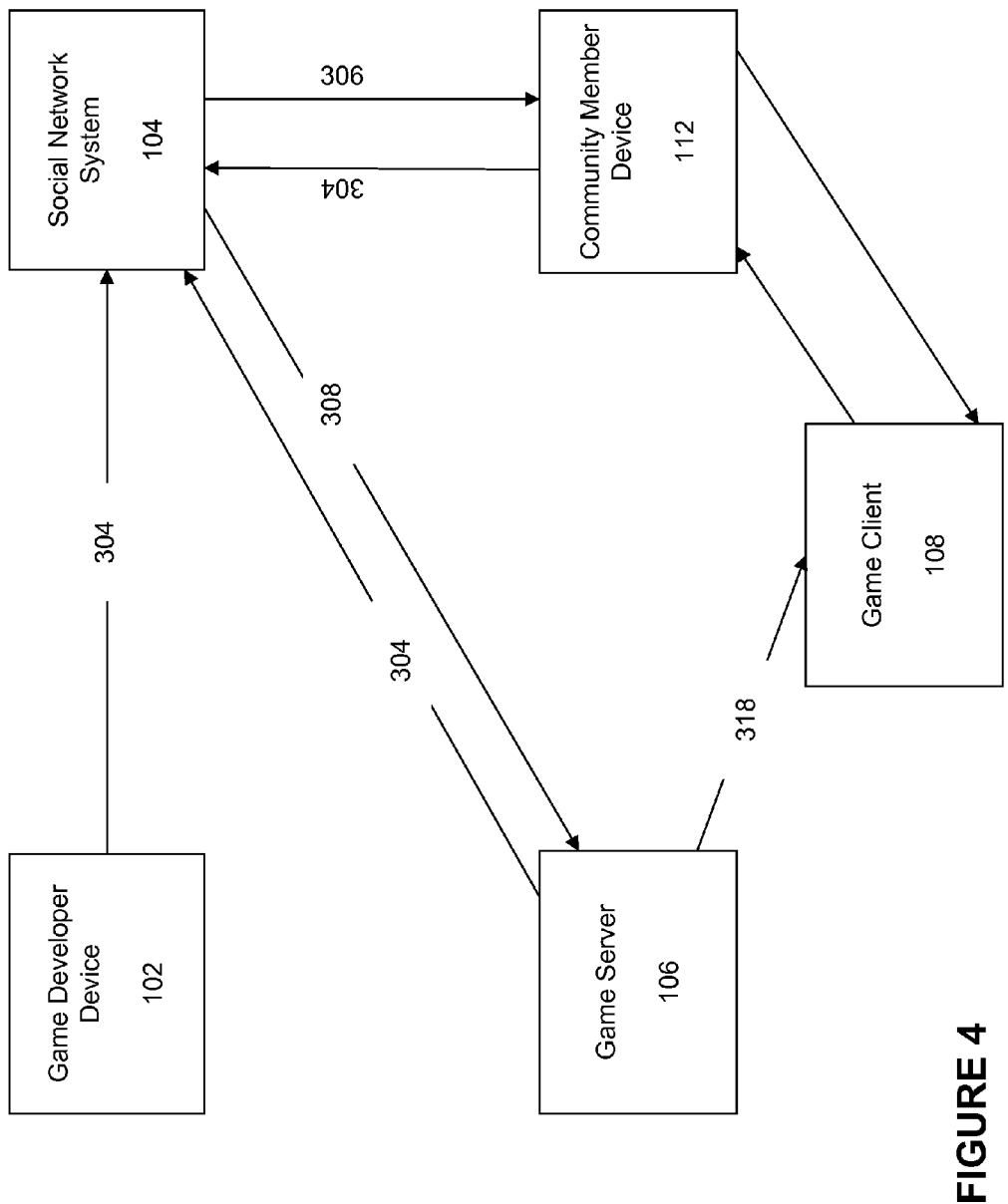
FIG. 4 is a schematic diagram illustrating data flow in a social networking polling and gaming system according to a particular embodiment.

Referring to FIG. 4, the flow of information between the components of the system 100 is illustrated. It is further noted that methods described herein may operate using software. The software may be tangibly embodied in one of more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, processors, etc.) separately. The functions described as being performed at various components may be performed at other components, and the various components bay be combined or separated. Other modifications also may be made.

It is to be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A method, comprising:
    transmitting, from a game server comprising a processor, a poll to a social network system via at least one of a network and a social graph application programming interface (API), wherein the poll comprises a prompt, at least two responses to the prompt, and an identifier associated with each response that is linked to a specific game change;
    receiving, at the game server from the social network system via the social graph API, a result associated with each identifier;
    calculating, using the game server processor, a winning identifier based on the received results;
    processing, on a gaming module of the game server, the specific game change associated with the winning identifier, wherein the specific game change enables one or more gameplay changes to a video game associated with the poll; and
    transmitting the specific game change from the game server to at least one game client, wherein the game client is a requesting game client.

2. The method of claim 1, wherein the calculating further comprises weighing each result associated with each identifier based on at least one of: a responder poll participation, a responder publicity, a responder friend response, a responder location, and a responder gameplay data.

3. The method of claim 2, wherein the responder gameplay data comprises at least one of: hours played, difficulty level reached, a frequency of play, game options purchased, game characters used, game points attained, a number of poll participant friends that play a game, and a number of poll participant friends that play a game with the poll participant.

4. The method of claim 1, wherein the specific game change is selected from the group comprising: additional gaming challenges, additional gaming scenarios, additional gaming levels, additional character options, additional character attribute options, additional difficulty options, bonus options, and booster options, modification of existing gaming challenges, modification of existing gaming scenarios, modification of existing character options, modification of existing character attribute options modification of existing bonuses, and modification of existing boosters.

5. The method of claim 1, wherein transmitting the specific game change comprises at least one of: unlocking communal gaming content, a dynamic alteration of prices of gaming good, a dynamic alteration of prices of gaming services, a dynamic alteration of availability of gaming goods, and a dynamic alteration of availability of gaming services.

6. The method of claim 1, wherein the poll further comprises an end time, and wherein the calculating occurs after the end time.

7. A non-transitory computer readable medium configured to perform the steps of claim 1.

8. A method, comprising:
    receiving, at a social network system comprising a processor, a poll from a game server via a network and a social graph application programming interface (API), wherein the poll comprises a prompt, at least two responses to the prompt, and an identifier associated with each response that is linked to a specific game change, wherein the specific game change enables one or more gameplay changes to a video game associated with the poll;
    receiving, at the social network system from at least one user, a selection of a response to the poll via the social graph API;
    calculating, using the social network system processor, a winning response; and
    transmitting the winning response from the social network system to the game server via the network and the social graph API.

9. The method of claim 8, wherein the calculating further comprises weighing each response based on at least one of: a responder poll participation; a responder publicity; a responder friend response; a responder location; and a responder gameplay data.

10. The method of claim 9, wherein the responder gameplay data comprises at least one of: hours played, difficulty level reached, a frequency of play, game options purchased, game characters used, game points attained, a number of poll participant friends that play a game, and a number of poll participant friends that play a game with the poll participant.

11. The method of claim 8, wherein the specific game change is selected from the group comprising: additional gaming challenges, additional gaming scenarios, additional gaming levels, additional character options, additional character attribute options, additional difficulty options, bonus options, booster options, modification of existing gaming challenges, modification of existing gaming scenarios, modification of existing character options, modification of existing character attribute options modification of existing bonuses, and modification of existing boosters.

12. The method of claim 8, wherein transmitting the specific game change comprises at least one of: unlocking communal gaming content, a dynamic alteration of prices of gaming good, a dynamic alteration of prices of gaming services, a dynamic alteration of availability of gaming goods, and a dynamic alteration of availability of gaming services.

13. The method of claim 8, wherein the poll further comprises an end time, and wherein the calculating occurs after the end time.

14. A non-transitory computer readable medium configured to perform the steps of claim 8.

15. A gameplay system, comprising:
a social network system, wherein a poll is transmitted to the social network system from a game server via a network and a social graph application programming interface (API), the poll comprising a prompt, at least two responses to the prompt, and an identifier associated with each response that is linked to a specific game change;
a social network community member device, wherein the social network community member device interacts with the social network system by providing a response to the poll;
a game server, wherein the game server receives the response and calculates a winning response to the poll; and
a game client device, which implements the specific game change in response to the winning response to the poll, wherein the specific game change enables one or more gameplay changes to a video game associated with the poll.

16. The system of claim 15, wherein calculating the winning response comprises weighing each response associated with each identifier based on at least one of: a responder poll participation; a responder publicity; a responder friend response; a responder location; and a responder gameplay data.

17. The system of claim 16, wherein the responder gameplay data comprises at least one of: hours played, difficulty level reached, a frequency of play, game options purchased, game characters used, game points attained, a number of poll participant friends that play a game, and a number of poll participant friends that play a game with the poll participant.

18. The system of claim 15, wherein the specific game change is selected from the group comprising: additional gaming challenges, additional gaming scenarios, additional gaming levels, additional character options, additional character attribute options, additional difficulty options, bonus options, booster options, modification of existing gaming challenges, modification of existing gaming scenarios, modification of existing character options, modification of existing character attribute options modification of existing bonuses, and modification of existing boosters.

19. The system of claim 15, wherein the specific game change comprises at least one of: unlocking communal gaming content, a dynamic alteration of prices of gaming good, a dynamic alteration of prices of gaming services, a dynamic alteration of availability of gaming goods, and a dynamic alteration of availability of gaming services.

20. The system of claim 15, wherein the poll further comprises an end time, and wherein the calculating occurs after the end time.

* * * * *